United States Patent [19]

Weaver et al.

[11] 4,374,767
[45] Feb. 22, 1983

[54] SUBSTITUTED ETHER OR THIOETHER ISOTHIAZOLE AZO DYES

[75] Inventors: Max A. Weaver; Jean C. Fleischer, both of Kingsport, Tenn.

[73] Assignee: Eastman Kodak Company, Rochester, N.Y.

[21] Appl. No.: 177,151

[22] Filed: Aug. 11, 1980

Related U.S. Application Data

[63] Continuation of Ser. No. 966,173, Dec. 4, 1978, abandoned.

[51] Int. Cl.$^3$ .................. C07C 107/04; C09B 29/039; C09B 29/06; C09B 29/26
[52] U.S. Cl. .................................... 260/158; 260/154; 260/156
[58] Field of Search ........................ 260/158, 154, 156

[56] References Cited

U.S. PATENT DOCUMENTS

| | | | |
|---|---|---|---|
| 3,143,540 | 8/1964 | Meen et al. .................... | 260/158 X |
| 3,480,641 | 11/1969 | Schundehutte et al. ....... | 260/158 X |
| 3,491,082 | 1/1970 | Weaver et al. ................. | 260/158 |
| 3,657,187 | 4/1972 | Weaver et al. ................. | 260/158 |
| 3,816,338 | 6/1974 | Weaver et al. ................. | 260/158 X |
| 4,041,025 | 8/1977 | Maier et al. .................... | 260/158 |

FOREIGN PATENT DOCUMENTS

| | | | |
|---|---|---|---|
| 1158996 | 7/1969 | United Kingdom .......... | 260/158 |
| 1379233 | 1/1975 | United Kingdom .......... | 260/158 |
| 1432361 | 4/1976 | United Kingdom .......... | 260/158 |

*Primary Examiner*—Charles F. Warren

*Attorney, Agent, or Firm*—Donald W. Spurrell; Daniel B. Reece, III

[57] ABSTRACT

Disclosed are novel azo dyes containing an isothiazole moiety substituted with ether or thioether groups. The dyes produce orange to violet shades on hydrophobic texture fiber including polyesters, polyamides, and cellulose esters and have excellent fastness properties including lightfastness, washfastness and resistance to sublimation. The dyes have the general formula

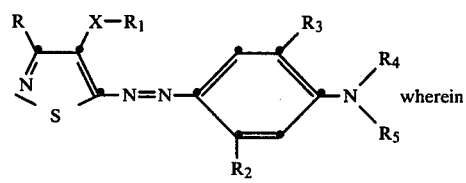

wherein R is lower alkyl or phenyl; X is O or S; $R_1$ is lower alkyl or substituted lower alkyl, cyclohexyl, phenyl or substituted phenyl; and when X is S, $R_1$ can be various heterocycles such as pyridyl, pryimidinyl, benzothiazolyl, benzoxazolyl, benzimidazolyl and azolyl radicals;

$R_2$ is hydrogen, lower alkyl, lower alkoxy, or acylamido;

$R_3$ is H, lower alkyl, or lower alkoxy; and $R_4$ and $R_5$ are selected from 1 to 2 of H, alkyl of 1–8 carbons, substituted alkyls, cyclohexyl, phenyl or substituted phenyl.

6 Claims, No Drawings

SUBSTITUTED ETHER OR THIOETHER ISOTHIAZOLE AZO DYES

This is a continuation of application Ser. No. 966,173, filed Dec. 4, 1978, now abandoned.

This invention relates to novel azo dyes containing an isothiazole moiety substituted with ether or thioether groups. The dyes produce orange to violet shades on hydrophobic texture fiber including polyesters, polyamides, and cellulose esters and have excellent fastness properties including lightfastness, washfastness and resistance to sublimation.

The dyes of this invention have the following general formula:

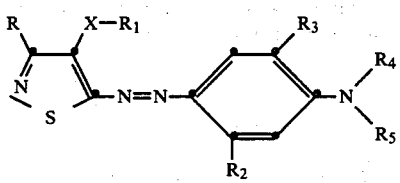

wherein R is lower alkyl or phenyl; X is O or S; $R_1$ is lower alkyl or lower alkyl substituted with 1–3 of —OH, Cl, Br, aryl, aryloxy, lower alkanoyloxy, or lower alkoxy which also may be substituted with —OH, Cl, Br, or lower alkoxy; cyclohexyl; phenyl; phenyl substituted with Cl, Br, lower alkoxy, or lower alkyl; and when X is S, R can be a radical selected from pyridyl, pyrimidinyl, benzothiazolyl, benzoxazolyl, benzimidazolyl, azolyl radicals having the formula

wherein Y is an oxygen or sulfur atom and Z is an ethylenically unsaturated, two atom chain of carbon atoms, or of a nitrogen and a carbon atom, wherein any of said azolyl radicals may be substituted with lower alkyl, phenyl, or phenyl substituted as in $R_1$ above; $R_2$ is hydrogen, lower alkyl, lower alkoxy, or acylamido where the acyl moiety is selected from formyl; lower alkoxycarbonyl; lower alkanoyl which also may be substituted with cyano, lower alkoxy, lower alkoxycarbonyl, phenoxy, or phenyl; aroyl which also may be substituted with halogen; cycloalkylcarbonyl; and lower alkylsulfonyl; $R_3$ is H, lower alkyl, or lower alkoxy; and $R_4$ and $R_5$ are selected from 1 or 2 of H; alkyl of 1–8 carbons; cyclohexyl; phenyl; phenylsubstituted with lower alkoxycarbonyl; and lower alkyl substituted with cyclohexyl, lower alkanoyloxy, lower alkoxycarbonyl, succinimido, lower alkanoylamido, lower alkylsulfonylamido, sulfamoyl, carbamoyl, lower alkyl sulfonyl, hydroxy, pyrolidono, phthalimido, aryl, cyano, aryloxy, lower, alkoxy carbonyloxy, lower alkoxy, phenoxy, and lower alkoxyalkoxy.

Typical of the azolyl radicals are thiazol-2-yl; oxazol-2-yl; 1,3,4-thiadiazol-2-yl; 1,3,4-oxadiazol-2-yl; 1,2,4-thiadiazol-5-yl; and benzothiazol-2-yl.

The dyes of the present invention are prepared by the following general method:

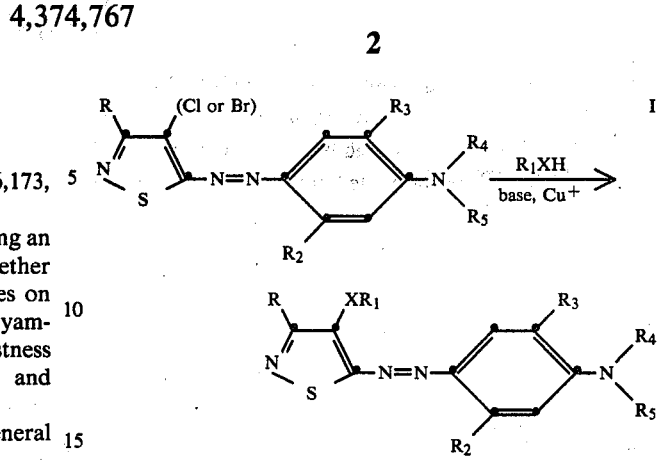

The preparation of compounds I is given in British Pat. No. 1,379,233. A typical preparation is as follows: 1.59 parts of 3-methyl-4-nitro-5-aminoisothiazole are stirred with a solution of 20 parts of acetic acid, 3.0 parts of concentrated hydrochloric acid and 15 parts of water. The mixture is cooled to 10°–15° C. To this is added 0.69 parts of sodium nitrite in 5 parts of water. The resultant diazo solution is filtered and the filtrate added to a solution of 1.32 parts of N,N-dimethylaniline in 50 parts of water and 1.5 parts of concentrated hydrochloric acid cooled to 0°–5° C. The resultant dyestuff is isolated by filtration after adjustment of the pH to 4.0 with sodium acetate. After washing with water the dyestuff is dried at 40° C. under vacuum.

The dyestuff corresponds to the formula

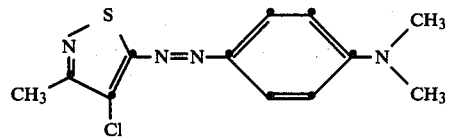

During this preparation the nitro group is replaced by a chlorine atom from the hydrochloric acid. If sulfuric acid is used instead of hydrochloric acid, the nitro group remains intact. The same dyestuff can be obtained by commencing with the corresponding 4-chloroisothiazole. It has been found that the halogen atom in the isothiazole nucleus is labile and can be replaced by anions such as $R_1X^-$ wherein $R_1$ and X are defined above. In the reaction a catalytic amount of cuprous bromide is employed, and the reactions in general are carried out in N,N-dimethylformamide, but other solvents may be employed.

The anion of the mercaptan or hydroxyl derivative need not be preformed, but may be formed in situ by using the $R_1XH$ compound plus a base capable of forming the salt. Potassium carbonate and sodium carbonate are acceptable bases for this reaction.

The followiing examples will illustrate further the preparation of the dyes of this invention.

EXAMPLE 1

Reaction of Bromo Dye with 2-Mercaptobenzothiazole

A mixture of 3-acetamido-4-(4-bromo-3-methylisothiazol-5-ylazo)-N,N-diethylaniline (1.0 g), 2-mercaptobenzothiazole (0.84 g), potassium carbonate (0.70 g), N,N-dimethylformamide, and a trace of cuprous bromide was heated at 135°–140° C. for one hour. Thin-layer chromatography showed that the reaction was complete. The reaction mixture was cooled, drowned into 200 ml water, the dye collected by filtration, washed with water, and dried in air. The dye produced bright red shades on polyester fabrics and had the following structure:

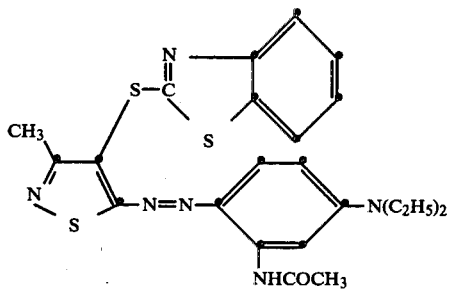

EXAMPLE 2

The bromo intermediate of Example 1 (1.0 g) was reacted with 3-mercapto-1(H)-1,2,4-triazole (0.5 g) exactly as described in Example 1 to yield the following dye:

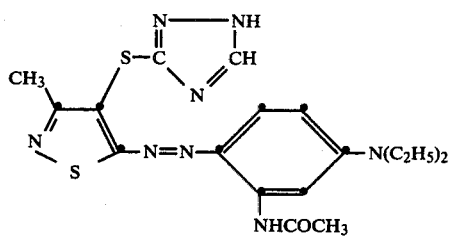

This dye produced bright red shades on polyamide, cellulose ester, and polyester fibers and had excellent fastness properties.

EXAMPLE 3

Reaction of Bromo Dye with Alkyl Mercaptan

A mixture of the bromo dye in Example 1 (1.0 g), 2-mercaptoethanol (0.4 g), potassium carbonate (0.7 g), and a trace of cuprous bromide was heated at 100° C. for 45 minutes. Thin-layer chromatography showed complete reaction. The product was isolated by drowning the reaction mixture into water, collecting the dye by filtration, washing with water and drying in air. The dye had the following structure:

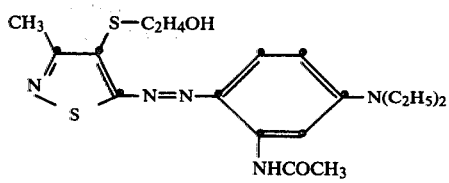

EXAMPLE 4

Acetylation of Dye in Example 3

A mixture of hydroxy dye of Example 3 (0.3 g), acetic acid (4 ml), and acetic anhydride (1 ml) was heated at 90°–95° C. for one hour. The reaction mixture was drowned into water (25 ml) and the product isolated by filtrating. The dye was washed with water and dried in air and had the following structure:

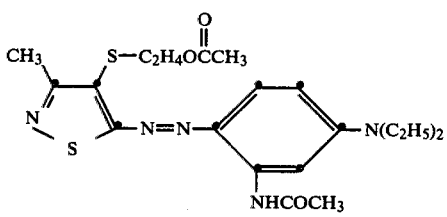

EXAMPLE 5

Reaction of Bromo Dye with Phenol

The bromo dye of Example 1 (1.0 g), phenol (0.5 g), potassium carbonate (0.7 g), N,N-dimethylformamide, and a trace of cuprous bromide were mixed and heated at 110°–115° C. for 45 minutes. The reaction was essentially complete as evidenced by thin-layer chromatography. The dye was isolated by drowning into water, filtering, drying and then recrystallizing from 50 ml of denatured alcohol. The structure of the dye was

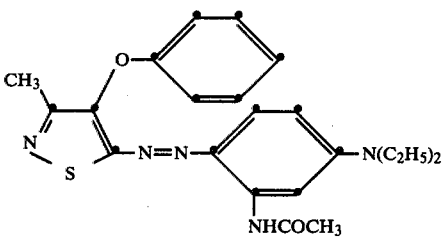

and when applied to polyamide and polyester fibers produced bright scarlet shades having excellent fastness properties.

The dyes in the following tables are generally prepared by the above procedures.

TABLE 1

Structure:

$$R-\underset{N}{\overset{S-R_1}{C}}=\underset{}{C}-N=N-\text{Ar}(R_2, R_3, NR_4R_5)$$

| Example | R | $R_1$ | $R_2$ | $R_3$ | $R_4$ | $R_5$ | Color |
|---|---|---|---|---|---|---|---|
| 6 | $CH_3$ | $C_6H_5$ | $NHCOCH_3$ | H | $C_2H_5$ | $C_2H_5$ | Bluish-Red |
| 7 | " | $C_6H_4-p-Cl$ | $NHCOC_2H_5$ | " | $C_3H_7-n$ | $C_3H_7-n$ | " |
| 8 | " | $C_6H_4-p-CH_3$ | $NHCOCH(CH_3)_2$ | " | $C_2H_5$ | $CH_2C_6H_5$ | " |
| 9 | " | $C_6H_4-o-Cl$ | $NHCOCH_3$ | " | $C_2H_5$ | $C_6H_{11}$ | " |
| 10 | " | $C_6H_{11}$ | " | " | " | $CH_2C_6H_{11}$ | " |
| 11 | " | $C_2H_5$ | " | " | " | $CH_2CH(CH_3)_2$ | " |
| 12 | " | $C_4H_9-n$ | $NHCOC_6H_5$ | " | " | $CH_2CH_2C_6H_5$ | " |
| 13 | " | $CH_2COOC_2H_5$ | $NHCOC_6H_{11}$ | " | " | $C_2H_5$ | " |
| 14 | " | $CH_2CH(OH)CH_2OH$ | $NHCOC_6H_4-oCl$ | " | " | " | " |
| 15 | " | $CH_2CH_2Cl$ | $NHCOH$ | " | " | " | " |
| 16 | " | $CH_2C_6H_5$ | $NHCOCH_2CN$ | " | " | " | " |
| 17 | " | $CH_2C_6H_4-p-Cl$ | $NHCOCH_2OCH_3$ | " | " | $CH_2CH(OH)CH_3$ | " |
| 18 | " | (benzothiazolyl: $\underset{S}{\overset{N=C}{\bigcirc}}$) | " | " | " | $CH_2CH_2CN$ | Red |
| 19 | " | " | " | " | $CH_2CH_2OCOCH_3$ | $C_2H_5$ | Bluish-Red |
| 20 | " | " | $CH_3$ | " | $C_2H_5$ | $C_2H_4CN$ | Red |
| 21 | " | " | " | " | $CH_2CH_2N\underset{COCH_2}{\overset{COCH_2}{\diagup\diagdown}}$ | $C_2H_5$ | Red |
| 22 | " | " | H | " | $C_2H_5$ | $C_2H_4CN$ | Scarlet |
| 23 | " | " | $CH_3$ | " | $CH_2CH_2NHCOCH_3$ | $C_2H_5$ | Red |
| 24 | " | " | " | " | $CH_2CH_2NHSO_2CH_3$ | " | " |
| 25 | " | " | " | " | $CH_2SO_2NH_2$ | " | " |
| 26 | " | " | " | " | $CH_2CONH_2$ | " | " |
| 27 | " | " | " | " | $CH_2CH_2COOCH_3$ | " | " |
| 28 | " | " | " | " | $CH_2CH_2OH$ | $CH_2C_6H_5$ | " |

TABLE 1-continued

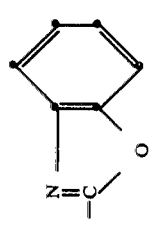

| Example | R | $R_1$ | $R_2$ | $R_3$ | $R_4$ | $R_5$ | Color |
|---|---|---|---|---|---|---|---|
| 29 | " | benzoxazole (N=C-O fused benzene) | NHCOCH$_3$ | " | C$_2$H$_5$ | C$_2$H$_5$ | Bluish-Red |
| 30 | " | " | " | OCH$_3$ | " | " | Violet |
| 31 | " | " | " | CH$_3$ | H | CH$_2$CH$_3$ | Red |
| 32 | " | " | " | " | " | CHCH(CH$_3$)C$_2$H$_5$ | Red |
| 33 | " | " | " | " | " | CH$_2$CH$_2$CN | " |
| 34 | " | " | " | " | " | CH$_2$CH(CH$_3$)CO$_2$C$_2$H$_5$ | " |
| 35 | " | benzothiazole (N=C-S fused benzene) | " | " | " | CH$_2$CH(CH$_3$)C$_4$H$_9$—n | " |
| 36 | " | " | " | OCH$_3$ | C$_2$H$_5$ | C$_2$H$_5$ | Violet |
| 37 | " | " | " | H | H | CH$_2$CH(CH$_3$)C$_4$H$_9$—n | " |
| 38 | " | (N=C-NH-CH=N triazole) | NHCO$_2$C$_2$H$_5$ | " | C$_2$H$_5$ | " | Bluish-Red |
| 39 | " | (N=C-S-CH=CH thiazole) | NHCOCH$_3$ | " | " | CH$_2$CH$_2$CH$_2$SO$_2$CH$_3$ | " |

TABLE 1-continued

Structure:
$R-\overset{S-R_1}{\underset{N}{C}}=\overset{}{\underset{S}{C}}-N=N-C_6H_3(R_2)(R_3)-N(R_4)(R_5)$

| Example | R | $R_1$ | $R_2$ | $R_3$ | $R_4$ | $R_5$ | Color |
|---|---|---|---|---|---|---|---|
| 40 | " | 2-pyridyl | " | " | " | CH$_2$CH$_2$OCH$_2$CH$_3$ | " |
| 41 | " | 2-pyrimidyl | " | " | " | —(CH$_2$CH$_2$O)$_2$C$_2$H$_5$ | " |
| 42 | " | 2-(acetamido)phenyl | " | " | " | CH$_2$CH$_2$OC$_6$H$_5$ | " |
| 43 | " | 2-(5-methyl-1,3,4-thiadiazolyl) | " | " | " | CH$_2$C$_6$H$_4$—p-COOCH$_3$ | " |
| 44 | " | 2-(5-phenyl-1,3,4-oxadiazolyl) | " | " | " | CH$_2$CH$_2$NHCOCH$_3$ | " |
| 45 | " | 1-ethyl-1,2,4-triazol-3-yl | " | " | " | CH$_2$CH$_2$OCC$_6$H$_5$ (O) | " |

TABLE 1-continued

Structure:

$$R-\underset{N}{\overset{S}{\underset{\|}{C}}}\!\!=\!\!\underset{}{\overset{S-R_1}{C}}-N=N-\underset{R_2}{\overset{R_3}{\diagdown}}\!\!\diagup\!\!\overset{R_4}{\underset{R_5}{\diagdown N\diagup}}$$

| Example | R | $R_1$ | $R_2$ | $R_3$ | $R_4$ | $R_5$ | Color |
|---|---|---|---|---|---|---|---|
| 46 | " | —$C_6H_4$—p—$C(CH_3)_3$ | " | " | " | $CH_3$ | " |
| 47 | " | " | $OCH_3$ | $CH_3$ | " | $C_2H_5$ | " |
| 48 | " | " | " | H | " | H | " |
| 49 | " | " | $NHSO_2CH_3$ | " | " | $C_2H_5$ | " |
| 50 | " | " | $NHCOCH_2OC_6H_5$ | " | " | " | " |
| 51 | " | " | $NHCOCH_2C_6H_5$ | " | " | " | " |
| 52 | " | " | $NHCOCH_2CH_2CO_2CH_3$ | " | " | " | " |
| 53 | " | " | $NHCOCH_3$ | " | —$CH_2CH_2N$(—$CH_2$—$C(=O)$—$CH_2$—) (succinimide-like ring) | " | " |
| 54 | " | " | " | " | —$CH_2CH_2N$(phthalimide) | " | " |
| 55 | " | " | $OCH_3$ | $OCH_3$ | " | $C_2H_5$ | Violet |
| 56 | " | $C_6H_5$ | $NHCOCH_3$ | H | $C_2H_5$ | " | Bluish-Red |
| 57 | " | $N\!\!=\!\!C\!-\!S$ (benzothiazolyl) | " | " | " | " | " |
| 58 | " | $CH_2CH_2OH$ | " | " | " | " | " |
| 59 | " | $CH_2CH_2OCH_3$ | " | " | " | " | " |
| 60 | " | $CH_2CH_2OCOCH_3$ | " | " | " | " | " |
| 61 | $CH_3$ | $C_6H_5$ | $NHCOCH_3$ | H | $CH_2CH_3$ | $CH_2C_6H_5$ | Scarlet |

TABLE 1-continued

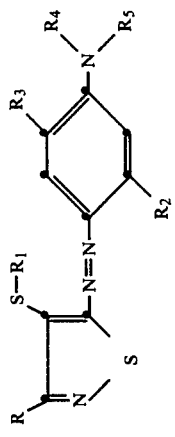

| Example | R | R₁ | R₂ | R₃ | R₄ | R₅ | Color |
|---|---|---|---|---|---|---|---|
| 62 | " | C₆H₄—p-Cl | " | " | " | CH₂CH₂CH₃ | " |
| 63 | " | C₆H₄—o-Cl | " | " | CH₂C₆H₁₁ | C₂H₅ | " |
| 64 | " | C₆H₄—m-CH₃ | " | " | C₆H₁₁ | " | " |
| 65 | " | C₆H₄—p-OCH₃ | " | " | CH₂CH₂C₆H₅ | " | " |
| 66 | C₆H₅ | C₆H₄—p-C₆H₁₁ | " | " | C₂H₅ | C₂H₅ | " |
| 67 | CH₃ | C₆H₄—o-CH₃ | " | " | C₂H₅ | CH₂CH(CH₃)C₂H₅ | " |
| 68 | " | C₆H₄—p-C₆H₅ | " | " | " | " | " |
| 69 | " | C₆H₄—p-OCH₂CH₂OH | " | " | " | " | Orange |
| 70 | " | C₆H₅ | CH₃ | " | " | CH₂CH₂CN | " |
| 71 | " | C₆H₅ | " | " | " | " | " |
| 72 | " | " | " | " | " | CH₂CH₂OCOCH₃ | " |
| 73 | " | " | H | " | CH₂CH₂CN | CH₂CH₃ | " |
| 74 | " | " | " | " | " | CH₂C₆H₅ | " |
| 75 | " | " | " | " | CH₂CH₂OCCH₃ (=O) | " | " |
| 76 | " | " | " | " | | | |
| 77 | " | " | CH₃ | CH₃ | H | CH₂CH₂CN | " |
| 78 | " | " | " | " | C₂H₅ | CH₂CH(CH₃)CO₂CH₃ | Scarlet |
| 79 | " | " | OCH₃ | OCH₃ | C₂H₅ | C₂H₅ | Red |
| 80 | " | " | NHCOCH₃ | OCH₃ | H | " | " |
| 81 | " | " | " | " | " | CH₂CH(CH₃)C₄H₉—n | " |
| 82 | " | " | " | " | CH₂C₆H₅ | C₆H₁₁ | " |
| 83 | " | " | NHCOC₆H₅ | " | CH₂CH₃ | C₂H₅ | " |
| 84 | " | " | NHCOC₂H₅ | H | CH₂CH₂NHCOCH₃ | CH₂C₆H₅ | " |
| 85 | " | " | | | | | |
| 86 | " | " | NHCOCH(CH₃)₂ | " | CH₂CH₂N(COCH₂–COCH₂) | " | Scarlet |
| 87 | " | " | NHCOC₆H₁₁ | CH₃ | CH₂CH₂OH | C₂H₅ | " |
| 88 | " | " | NHCOCH₃ | " | H | CH₂CH(CH₃)C₂H₅ | " |
| 89 | " | " | NHCOC₆H₅ | H | C₂H₅ | C₂H₅ | " |
| 90 | " | " | NHCOCH₂OCH₃ | " | " | " | " |
| 91 | " | " | NHCOCH₂OC₆H₅ | " | " | " | " |
| 92 | " | " | NHCOCH₂C₆H₅ | " | " | " | " |
| 93 | " | " | NHSO₂CH₃ | " | " | " | " |
| 94 | " | " | " | " | " | " | " |

TABLE 1-continued

| Example | R | $R_1$ | $R_2$ | $R_3$ | $R_4$ | $R_5$ | Color |
|---|---|---|---|---|---|---|---|
| 95 | " | $C_4H_9-n$ | $NHCO_2C_2H_5$ | " | " | " | " |
| 96 | " | $CH_2OC_6H_5$ | $NHCOCH_3$ | " | " | " | " |
| 97 | " | $CH_2CH_2OCH_3$ | " | " | " | " | " |
| 98 | " | $C_6H_5$ | " | " | $CH_2CH_2CONH_2$ | " | " |
| 99 | " | " | " | " | $CH_2CH_2OC_6H_5$ | " | " |
| 100 | " | " | " | " | $CH_2CH_2OC_2H_5$ | " | " |
| 101 | " | " | " | " | $CH_2CH_2OC_2H_5$ | " | " |
| 102 | " | " | " | " | $CH_2CH_2OCOC_2H_5$ | " | " |
| 103 | " | " | " | " | $CH_2CH(OCOCH_3)CH_2OCH_3$ | " | " |
| 104 | " | " | " | " | $CH_2CH(OCOCH_3)CH_2OCOCH_3$ | " | " |

The invention has been described in detail with particular reference to preferred embodiments thereof, but it will be understood that variations and modifications can be effected within the spirit and scope of the invention.

We claim:

1. Azo compounds of the formula:

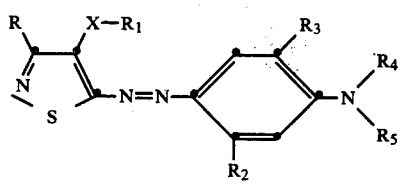

wherein R is lower alkyl or phenyl; X is O or S; $R_1$ is selected from lower alkyl, cyclohexyl, and phenyl wherein said lower alkyl is unsubstituted or substituted with 1-3 of —OH, Cl, Br, aryl, aryloxy, lower alkanoyloxy, lower alkoxy, or lower alkoxy substituted with —OH, Cl, Br, or lower alkoxy, and wherein said phenyl is unsubstituted or substituted with Cl, Br, lower alkoxy, or lower alkyl, and when X is S, $R_1$ is further selected from pyridyl, pryimidinyl, benzothiazolyl, benzoxazolyl, benzimidazolyl, azolyl radicals having the formula

wherein Y is an oxygen or sulfur atom and Z is an ethylenically unsaturated group of two carbon atoms or of a nitrogen and a carbon atom, wherein said azolyl radicals may be substituted with lower alkyl, phenyl, or phenyl substituted as above for $R_1$; $R_2$ is selected from hydrogen, lower alkyl, lower alkoxy, formamido, lower alkoxycarbonylamino, lower alkanoylamino, lower alkanoylamino substituted with cyano, lower alkoxy, lower alkoxycarbonyl, phenoxy, or phenyl, phenoxy, halogen substituted phenoxy, cycloalkylcarbonyl, and lower alkylsulfonyl; $R_3$ is H, or lower alkyl; and $R_4$ and $R_5$ are independently selected from H, alkyl of 1-8 carbons, cyclohexyl, phenyl, lower alkoxycarbonyl substituted phenyl, and lower alkyl substituted with cyclohexyl, lower alkanoyloxy, lower alkoxycarbonyl, succinimido, lower alkanoylamino, lower alkylsulfonylamino, lower alkyl sulfonyl, sulfamoyl, carbamoyl, hydroxy, pyrrolidono, phthalimido, aryl, cyano, aryloxy, lower alkoxycarbonyloxy, lower alkoxy, phenoxy, or lower alkoxyalkoxy.

2. A compound of claim 1 having the formula

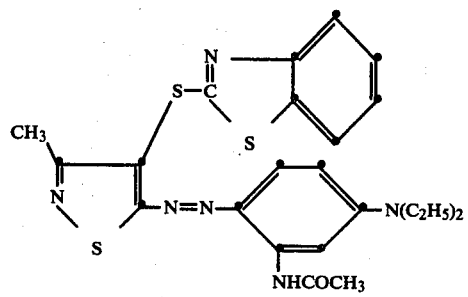

3. A compound of claim 1 having the formula

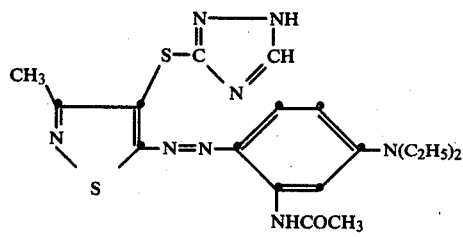

4. A compound of claim 1 having the formula

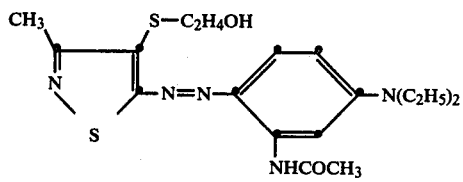

5. A compund of claim 1 having the formula

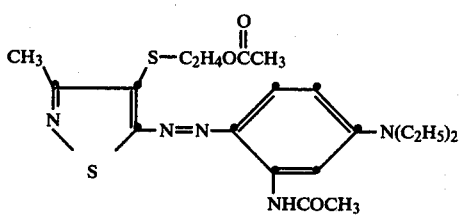

6. A compound of claim 1 having the formula

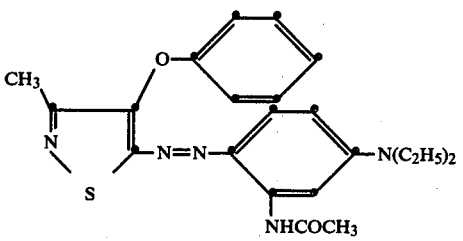

* * * * *